United States Patent
Lucas et al.

(10) Patent No.: US 10,870,335 B2
(45) Date of Patent: Dec. 22, 2020

(54) HUMIDIFIER HAVING AN INTEGRATED WATER SEPARATOR FOR A FUEL CELL SYSTEM, FUEL CELL SYSTEM AND VEHICLE COMPRISING SAME

(71) Applicants: AUDI AG, Ingolstadt (DE);
VOLKSWAGEN AG, Wolfsburg (DE)

(72) Inventors: Christian Lucas, Braunschweig (DE);
Rune Staeck, Gifhorn (DE)

(73) Assignees: AUDI AG, Ingolstadt (DE);
VOLKSWAGEN AG, Wolfsburg (DE)

( * ) Notice: Subject to any disclaimer, the term of this patent is extended or adjusted under 35 U.S.C. 154(b) by 75 days.

(21) Appl. No.: 16/062,032

(22) PCT Filed: Dec. 8, 2016

(86) PCT No.: PCT/EP2016/080244
§ 371 (c)(1),
(2) Date: Jun. 13, 2018

(87) PCT Pub. No.: WO2017/102538
PCT Pub. Date: Jun. 22, 2017

(65) Prior Publication Data
US 2018/0370336 A1    Dec. 27, 2018

(30) Foreign Application Priority Data
Dec. 17, 2015 (DE) .................. 10 2015 122 144

(51) Int. Cl.
*B60H 3/02* (2006.01)
*H01M 8/0289* (2016.01)
*H01M 8/04119* (2016.01)

(52) U.S. Cl.
CPC .......... *B60H 3/022* (2013.01); *H01M 8/0289* (2013.01); *H01M 8/04149* (2013.01); *H01M 2250/20* (2013.01); *Y02T 90/40* (2013.01)

(58) Field of Classification Search
CPC .............. B60H 3/022; H01M 8/04149; H01M 2250/20; Y02T 90/32
See application file for complete search history.

(56) References Cited

U.S. PATENT DOCUMENTS 7,745,032 B2 * 6/2010 Nishimura .......... H01M 8/1023
429/413
8,993,182 B2 3/2015 Gerhardt et al.
(Continued)

FOREIGN PATENT DOCUMENTS

DE    112004000908 T5    4/2006
DE    102005028717 A1    9/2006
(Continued)

OTHER PUBLICATIONS

Machine Translation of WO 03/090301 to Heller, eSpacenet, Oct. 2003, "Electrode Plate Comprising a Humidification Region", description.*

*Primary Examiner* — Filip Zec
(74) *Attorney, Agent, or Firm* — Seed IP Law Group LLP (57) ABSTRACT

It is proposed to arrange a plurality of individual separator elements (48, 49) on the first side (40) of the membrane (38) in order to provide a humidifier (37) with integrated water separator, in particular for fuel cells (11) having a water vapor permeable membrane (38) and separator elements (48, 49) for separating water, wherein the membrane (38) on a first side (40) is in contact with a first channel (41) for a first humid gas stream, and on the second side (42) is in contact with a second channel (43) for a second, dry gas stream to be humidified, which allows an optimized exchange of moisture between the exhaust gas and operating medium streams of a fuel cell.

Also provided is a fuel cell system and vehicle having the aforementioned humidifier.

18 Claims, 7 Drawing Sheets

(56) References Cited

U.S. PATENT DOCUMENTS

| | | | | |
|---|---|---|---|---|
| 9,457,640 B2* | 10/2016 | Ikeya | ................ | B60H 1/14 |
| 9,751,048 B2* | 9/2017 | Mizufune | .............. | B61H 13/34 |
| 9,954,236 B2* | 4/2018 | Fasold | .............. | H01M 8/04149 |
| 2001/0046616 A1* | 11/2001 | Mossman | .......... | H01M 8/04119 |
| | | | | 429/414 |
| 2005/0191530 A1* | 9/2005 | Mossman | .............. | B01D 69/02 |
| | | | | 429/414 |
| 2007/0007674 A1 | 1/2007 | Hasegawa et al. | | |
| 2007/0122669 A1* | 5/2007 | Kusano | ............... | H01M 8/2485 |
| | | | | 429/414 |
| 2009/0229899 A1* | 9/2009 | Takeshita | .......... | H01M 8/04141 |
| | | | | 180/65.31 |
| 2014/0227618 A1* | 8/2014 | Handgraetinger | ........................... | |
| | | | | H01M 8/04029 |
| | | | | 429/414 |
| 2015/0325869 A1* | 11/2015 | Fasold | ...................... | F24F 6/00 |
| | | | | 429/413 |

FOREIGN PATENT DOCUMENTS

| | | |
|---|---|---|
| DE | 102012014611 A1 | 1/2014 |
| DE | 102012017139 A1 | 3/2014 |
| DE | 102012018863 A1 | 3/2014 |
| DE | 102013003599 A1 | 9/2014 |
| DE | 102013004799 A1 | 9/2014 |
| JP | 2004-207022 A | 7/2004 |
| JP | 2013-171727 A | 9/2013 |
| WO | 2003/090301 A2 | 10/2003 |

\* cited by examiner

HUMIDIFIER HAVING AN INTEGRATED WATER SEPARATOR FOR A FUEL CELL SYSTEM, FUEL CELL SYSTEM AND VEHICLE COMPRISING SAME

The invention relates to a humidifier for humidifying process gases, in particular for fuel cells, having a water vapor-permeable membrane and separator elements for separating water, wherein the membrane is in contact on a first side with a first channel for a first humid gas stream and on the second side with a second channel for a second dry gas stream to be humidified; to a fuel cell system with a humidifier; and to a vehicle having such a humidifier or such a fuel cell system.

Fuel cells use the chemical conversion of a fuel with oxygen into water in order to generate electrical energy. For this purpose, fuel cells contain as a core component what is known as the membrane electrode assembly (MEA), which is an arrangement of an ion-conducting (usually proton-conducting) membrane and in each case a catalytic electrode (anode and cathode) arranged on each side of the membrane. The latter generally comprise supported precious metals, in particular platinum. In addition, gas diffusion layers (GDL) can be arranged on both sides of the membrane electrode assembly on the sides of the electrodes facing away from the membrane. Generally, the fuel cell is formed by a plurality of MEAs arranged in the stack, the electrical power outputs of which add up. Between the individual membrane electrode assemblies, bipolar plates (also called flux field plates) are usually arranged which ensure a supply of the individual cells with the operating media, i.e. the reactants, and are usually also used for cooling. In addition, the bipolar plates ensure an electrically conductive contact to the membrane electrode assemblies.

During operation of the fuel cell, the fuel (anode operating medium), particularly hydrogen $H_2$ or a gas mixture containing hydrogen, is supplied to the anode via an open flow field of the bipolar plate on the anode side, where electrochemical oxidation of $H_2$ to $H^+$ with loss of electrons takes place ($H_2 \rightarrow 2H^+ + 2e^-$). A transport of the $H^+$ protons from the anode chamber into the cathode chamber is effected via the electrolytes or the membrane, which separates the reaction chambers from each other in a gas-tight and electrically insulated manner (in a water-bound or water-free manner). The electrons provided at the anode are guided to the cathode via an electrical line. The cathode receives oxygen or a gas mixture containing oxygen (such as air) via an open flow field of the bipolar plate on the cathode side, so that a reduction of $O_2$ to $O^{2-}$ with gain of electrons takes place ($\frac{1}{2}O_2 + 2e^-$). At the same time, the oxygen anions react in the cathode chamber with the protons transported across the membrane to form water ($O^{2-} + 2H^+ \rightarrow H_2O$).

The most advanced fuel cell technology currently available is based on polymer electrolyte membranes (PEMs), in which the membrane is formed from a moistened polyelectrolyte (such as Nafion®) and the water-bound electrolytic conduction takes place via hydrated protons. Such polymer electrolyte membranes are dependent on the presence of water for proton conduction. Below a certain temperature, the cathodically formed product water as a source of moisture for moistening the membrane may still be sufficient for this purpose. At higher temperatures, however, moisture is increasingly discharged with the cathode exhaust gas from the fuel cell stack. To counteract dehydration of the fuel cell membrane here, the moisture discharge must be compensated by active supply of water.

It is thus known to use external humidifiers to humidify the process gas to be supplied to the fuel cell, in most cases the air to be supplied to the cathode compartments. In particular, a portion of the moisture discharged from the stack with the exhaust air of the cathode chambers is returned.

The anode/cathode exhaust gas path of the fuel cell system may further have a turbine to recover energy by expanding the exhaust gases, for example for driving a compressor in the anode/cathode supply path. This turbine can be damaged by liquid water contained in the exhaust gas, or by condensation. Therefore, the turbine is usually arranged in the exhaust line downstream of the humidifier, and optionally of additional water separators. Various relative arrangements of humidifiers and water separators are known from the prior art.

DE 10 2012 018 863 A1 discloses a gas/gas humidifying device, through which flows an operating medium stream flowing to a fuel cell and an exhaust gas stream flowing from the fuel cell, which flows are separated from a water vapor permeable membrane in the interior of the humidifying device. The gas/gas humidifying device also has an integrated water separator which is integrated after the membranes in the flow direction of the humid exhaust gases.

A similarly designed humidifier in a fuel cell system is disclosed in DE 102013003599 A1, wherein an impact protection prevents humid gas entering the humidifier from indirectly hitting the membranes and clogging them via liquid water.

DE 102012014611 A1 describes a separator for a fuel cell system which makes use of a hydrophilic membrane through which liquid water can pass, and thus can be separated from a gas stream.

The aforementioned humidifiers with downstream separators have the disadvantage that a uniformly humidified membrane of the humidifier cannot be reliably ensured.

The invention is now based on the object to propose a humidifier for a fuel cell system which at least partially overcomes the disadvantages of the prior art and enables an optimized exchange of moisture between the exhaust gas and operating medium streams of a fuel cell.

The invention provides a humidifier for humidifying process gases, in particular for fuel cells, comprising a water vapor-permeable membrane and separator elements for separating water (water vapor), wherein the membrane on a first side is in contact with a first channel for a first water vapor-containing and therefore humid gas stream, and on the second side is in contact with a second channel for a second dry gas stream to be humidified, wherein a plurality of separate separator elements is arranged on the first side of the membrane.

Thus, advantageously, for example in the case of a fuel stack or fuel cell system, a portion of the moisture of the exhaust air coming from the fuel cell stack can be transferred to the dry supply air for the fuel cell stack, so that the power density and the lifetime of the fuel cell increase given operation at high temperatures. In addition to the aforementioned increase in power density and lifetime of the fuel cells, the separation of water is often necessary because, in fuel cell systems, the exhaust air is passed through a turbine to recover residual energy from the exhaust air, such as thermal energy and pressure energy, wherein water droplets would damage said turbine.

In addition, via the integration of a water separator into the humidifier it is achieved that, if necessary, only one further humidifier is required downstream of the water separator.

Suitable hydrophilic membranes for use in the humidifier according to the invention are known to the person skilled in the art. For example, the membrane may have Nafion or consist of Nafion.

Preferably, the humidifier according to the invention is a plate humidifier having a planar membrane, wherein the cited structures may be formed repetitively of first channel, second channel, membrane, and separator elements to obtain a humidifier stack, which can be adjusted advantageously to the particular given conditions of different fuel cell systems by increasing the membrane area.

The separator elements are preferably distributed over the surface of the membrane to deposit water over the entire area, which moistens the membrane, such that an increased efficiency of the humidifier is advantageously achieved without, however, reducing the velocity of the gas stream, which would lead to undesirable pressure fluctuations.

The separator elements are preferably fixed by a plurality of flow webs adjacent to the membrane, which also direct the gas stream over the membrane in a targeted manner to bring about an optimal exchange of moisture between the two gas streams. In addition, the flow webs can advantageously additionally serve as separator elements.

The separator elements are also advantageously used to support or stabilize the membrane.

Corresponding flow webs may also be provided on the second side of the membrane to direct the gas stream to be humidified.

The flow webs preferably run in a straight line, but preferred embodiments of the flow webs are also provided in which the flow webs are not directed in a straight line, for example if the flow webs should also at least partially serve as separator elements.

The separator elements preferably have a height which corresponds to that of the first channel. By contrast, the flow webs can also have this height but also a lower height, since the direction of the gas stream takes place even at a lower height. If the flow webs are also at least partially designed as a separator element, a height corresponding to the height of the first channel is preferred.

The separator elements and optionally also the flow webs are preferably at least partially designed so that they can receive a liquid volume being in contact with the membrane, so that advantageously sufficient water is always available for humidification, even if less water accumulates in the exhaust air under certain operating conditions of the fuel cell system.

To form such separator elements, they must have a recess in relation to the force of gravity, which recess can receive the water. This recess is open to the membrane and preferably to the wall of a channel.

According to a particularly preferred embodiment of the invention, the humidifier has a collecting container for collecting the separated water flowing down the membrane without penetrating it. This collecting container is arranged in the region of the membrane and is also connected to the first channel. Since this collecting container cannot absorb all water accumulating in certain operating states of the fuel cell system, it preferably has a discharge opening which can be designed as an overflow and/or as a controllable discharge valve.

In the area of the collecting container, it is sufficient for the separator elements to serve only for separation and not additionally to receive a liquid volume.

This collecting container also serves as a reservoir for the water for operating conditions in which more water is needed. For this purpose, the membrane is preferably designed such that it extends indirectly or directly into the collecting container in order to draw water.

As already stated, the separator elements and possibly also the flow webs can be designed such that they can receive a volume of liquid in contact with the membrane. In this embodiment, the separator elements located adjacent to the collecting container, and optionally the flow webs, can be designed as separating elements only.

According to a preferred embodiment, the separator elements and/or the flow webs may consist of a porous material so that water can be stored in the vicinity of the membrane and dispensed as needed.

In addition, it can be provided that the membrane is partially provided on the first side with a porous coating, and only after this coating has been overflowed by the humid gas can separator elements preferably still be used. The coating preferably protrudes into a collecting container for the water separated by the separator elements, so that the separated water is fed to the entire membrane via a type of wicking effect via the coating.

The humidifier may be designed such that the first gas stream and the second gas stream are conducted in cross-flow, counter-flow or co-flow. The cited flow webs are to be designed accordingly.

Also claimed according to the invention is a fuel cell system having a fuel cell stack having an anode supply with an anode supply path for supplying an anode operating medium to the fuel cell stack and having an anode exhaust path for discharging an anode exhaust gas from the fuel cell stack, a cathode supply with a cathode supply path for supplying a cathode operating medium to the fuel cell stack, and having a cathode exhaust path for discharging a cathode exhaust gas from the fuel cell stack, wherein the humidifier is arranged in the anode supply and/or the cathode supply.

The subject matter of the invention is also a vehicle with a humidifier or fuel cell system according to the invention.

Additional preferred embodiments of the invention arise from the remaining features mentioned in the dependent claims.

The various embodiments of the invention mentioned in this application may be combined advantageously with one another unless stated otherwise in individual cases.

Figure 1:
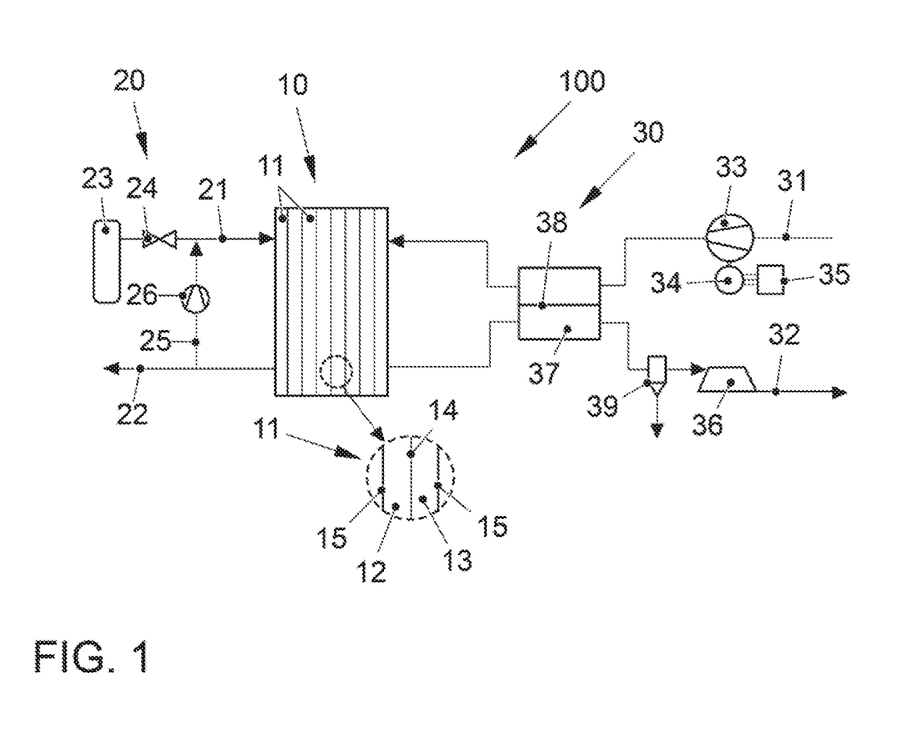
FIG. 1 a schematic view of a fuel cell system according to the invention, with humidifier, FIG. 2 a schematic, sectional view of a humidifier according to the invention with separator elements and linear flow channels, FIG. 3 a schematic, sectional view of a humidifier according to the invention with separator elements and linear flow channels according to a second embodiment, FIG. 4 a schematic, sectional view of a humidifier according to the invention with separator elements which are designed to receive a liquid volume, and linear flow channels, FIG. 5 a schematic, sectional view of a humidifier according to the invention with separator elements which are designed to receive a liquid volume, and linear flow channels according to a second embodiment, FIG. 6 a schematic, sectional view of a humidifier according to the invention with separator elements which are designed to receive a liquid volume, and wave-shaped flow channels, and FIG. 7 a schematic, sectional view of a humidifier according to the invention with separator elements and a porous separator element which is designed to receive a liquid volume.

The invention is explained below in exemplary embodiments in reference to the respective drawings. The following is shown:

FIG. 1 shows a fuel cell system, denoted overall by 100, according to a preferred embodiment of the present invention. The fuel cell system 100 is part of a vehicle (not shown), in particular an electric vehicle, which has an electric traction motor which is supplied with electrical energy by the fuel cell system 100.

The fuel cell system 100 includes as a core component a fuel cell stack 10 having a plurality of stacked individual cells 11. Each individual fuel cell 11 comprises an anode chamber 12 as well as a cathode chamber 13 which are separated from one another by an ion-conductive polymer electrolyte membrane 14 (see detail section). The anode chamber and cathode chamber 12, 13 in each case comprise a catalytic electrode, the anode or the cathode (not shown), which catalyzes the respective partial reaction of the fuel cell conversion. The anode electrode and cathode electrode have a catalytic material, for example platinum, which is supported on an electrically conductive carrier material with a large specific surface, for example a carbon-based material. Also arranged between two such membrane electrode assemblies is a bipolar plate, indicated by 15, which serves to supply the operating media in the cathode and anode chambers 12, 13 and also establishes the electrical connection between the individual fuel cells 11.

In order to supply the fuel cell stack 10 with the operating gases, the fuel cell system 100 comprises on the one hand an anode supply 20 and on the other hand a cathode supply 30.

The anode supply 20 comprises an anode supply path 21, which serves to supply an anode operating medium (fuel), for example hydrogen, to the anode chambers 12 of the fuel cell stack 10. For this purpose, the anode supply path 21 connects a fuel storage 23 to an anode inlet of the fuel cell stack 10. The anode supply 20 also comprises an anode exhaust path 22 which discharges the anode exhaust gas from the anode chambers 12 via an anode outlet of the fuel cell stack 10. The anode operating pressure on the anode sides 12 of the fuel cell stack 10 is adjustable via an adjusting means 24 in the anode supply path 21. As shown, the anode supply 20 may moreover have a fuel recirculation line 25 which connects the anode exhaust path 22 to the anode supply path 21. The recirculation of fuel is customary in order to return the mostly over-stoichiometric supplied fuel to the stack and to use it. In the fuel recirculation line 25, a compressor 26 is arranged by way of example, with which the recirculation rate is adjustable.

The cathode supply 30 comprises a cathode supply path 31 which supplies an oxygen-containing cathode operating medium to the cathode chambers 13 of the fuel cell stack 10, in particular air which is sucked in from the environment. The cathode supply 30 also comprises a cathode exhaust path 32, which discharges the cathode exhaust gas (in particular the exhaust air) from the cathode chambers 13 of the fuel cell stack 10 and supplies it, if appropriate, to an exhaust system (not shown).

A compressor 33 is arranged in the cathode supply path 31 for conveying and compressing the cathode operating medium. In the embodiment shown, the compressor 33 is designed as a compressor which is driven mainly by an electric motor, the driving of said compressor being effected via an electric motor 34 equipped with a corresponding electronic power system 35. The compressor 33 may also be driven by a turbine 36 (optionally with variable turbine geometry) disposed in the cathode exhaust path 32, supported via a common shaft (not shown).

The fuel cell system 100 further has a humidifier 37 according to the invention. On the one hand, the humidifier 37 is arranged in the cathode supply path 31 in such a way that it can be flowed through by the cathode operating gas. On the other hand, it is arranged in the cathode exhaust path 32 such that the cathode exhaust gas can flow through it. The humidifier 37 typically has a plurality of membranes permeable by water vapor which are designed to be flat. In this case, the comparatively dry cathode operating gas (air) flows over one side of the membranes 38, and the comparatively moist cathode exhaust gas (exhaust gas) flows over the other side. Driven by the higher partial pressure of water vapor in the cathode exhaust gas, water vapor passes across the membrane into the cathode operating gas, which is humidified in this way.

The part of the cathode exhaust gas path before the turbine 36, downstream of the humidifier 37, also has a water separator 38 which prevents the turbine from being damaged by water vapor entrained in the cathode exhaust gas even after flowing through the humidifier 37.

Various further details of the anode and cathode supply 20, 30 are not shown in the simplified FIG. 1 for reasons of clarity. A water separator may furthermore also be installed in the cathode exhaust gas path 22 in order to condense and drain product water arising from the fuel cell reaction. Finally, the anode exhaust gas line 22 can merge into the cathode exhaust gas line 32 so that the anode exhaust gas and the cathode exhaust gas are discharged via a common exhaust gas system. The cathode supply 30 can also have a wastegate line 37 which connects the cathode supply line 31 to the cathode exhaust gas line 32, i.e., represents a bypass of the fuel cell stack 10.

All actuating means 24, 26, 38 of the fuel cell system 100 may be designed as controllable or non-controllable valves or flaps. Corresponding additional actuating means may be arranged in the lines 21, 22, 31 and 32 in order to be able to isolate the fuel cell stack 10 from the environment.

The embodiments of the humidifier 37 shown in FIGS. 2 to 7 are greatly simplified for a better overview and are not shown correctly in perspective. Always located in the image plane is the membrane 38, which on a first side 40 adjoins a first channel 41 with a first humid gas stream (as explained for FIG. 1, the cathode exhaust gas) and on a second side 42 adjoins a second channel 43 with a second gas stream (cathode operating gas) to be humidified. In the plan view of the membrane in FIGS. 2 to 7, therefore, the first side 40 can be seen via which the first, humid gas stream flows in channel 41. The separated water, symbolized by an arrow 44, leads in the direction of the force of gravity g across the membrane 38. The membrane 38 and first and second channels 41, 43 are fixed in a frame 45, which is part of a housing (not shown). The frame 45 further comprises a collecting container 46 for liquid water which has been separated in the region of the membrane 38 and, as indicated by the arrow 44, following the force of gravity g reaches the lower end of the membrane 38 where the collection container 46 is arranged and where said liquid water is drained into. Due to this configuration of the humidifier 37, humidification of the membrane 38 can take place via water located in the collecting container 46 even if only a small moisture content of the first gas stream is present in corresponding operating states of the fuel cell system 100, in that the membrane 38 transports the water from the collecting container to dry regions of the membrane 38 via a wicking effect against the force of gravity g. The collecting container may have an overflow, a drain valve or the like (not shown here) to drain excess water.

Figure 2:
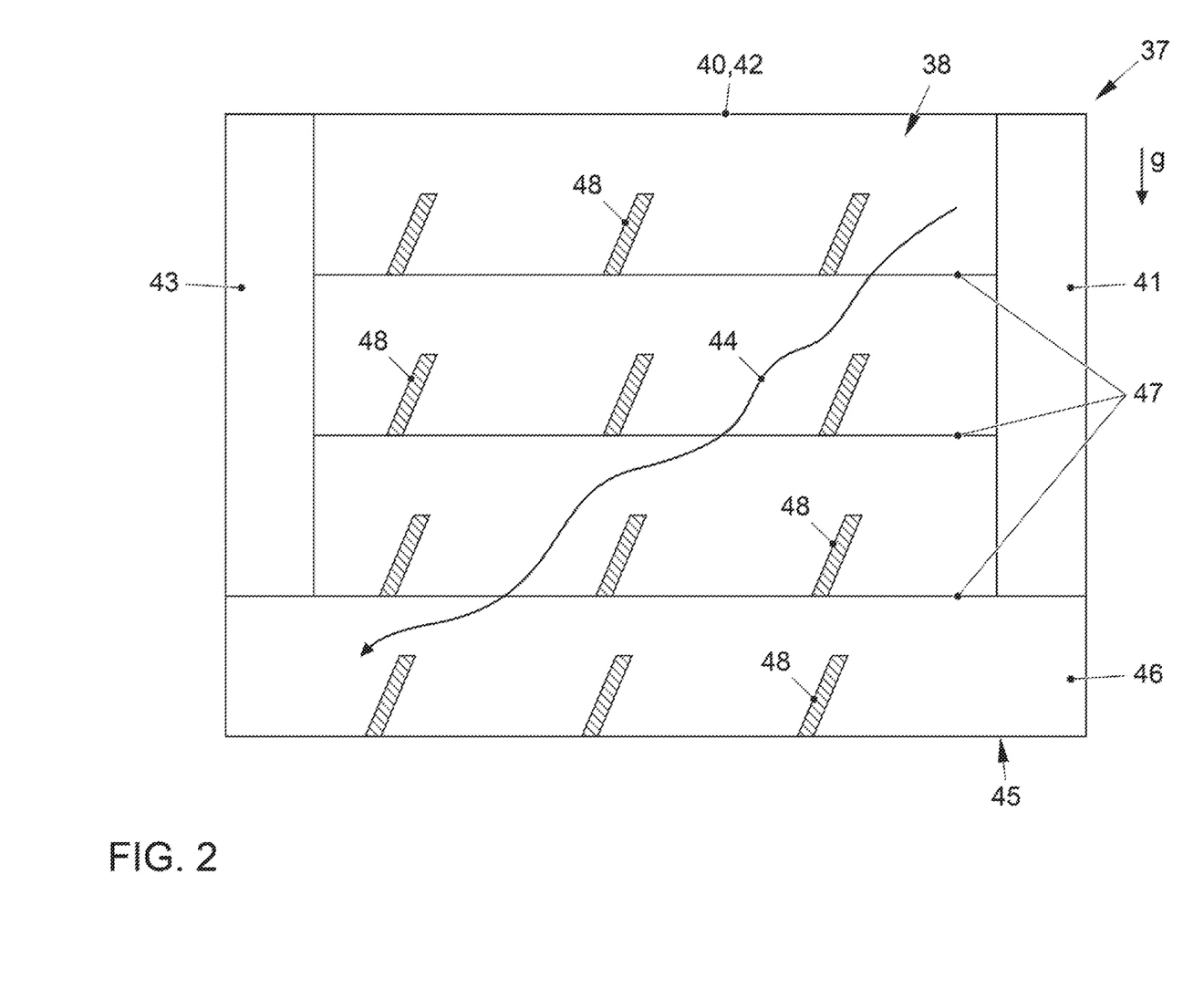
Figure 3:
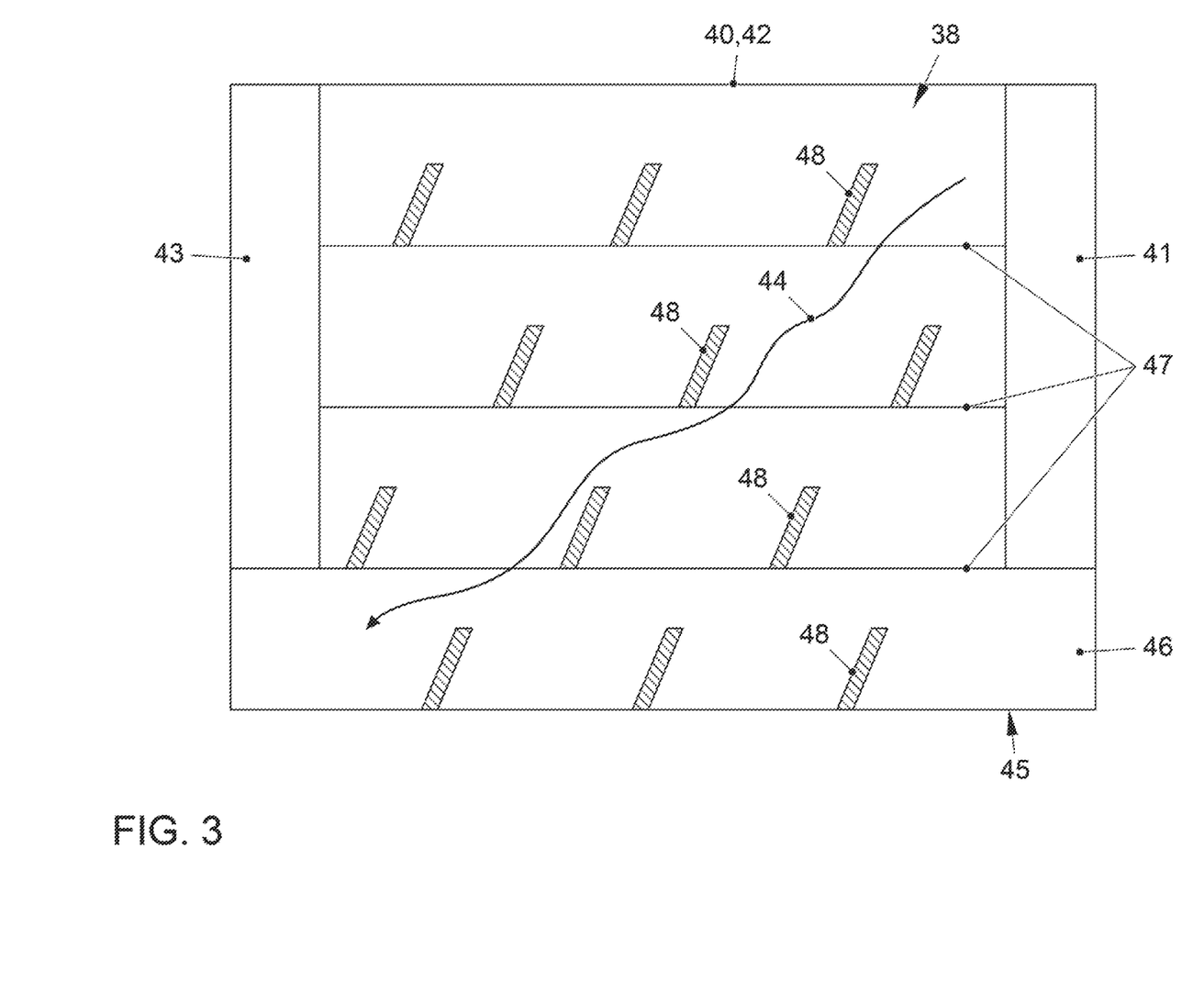
Figure 7:
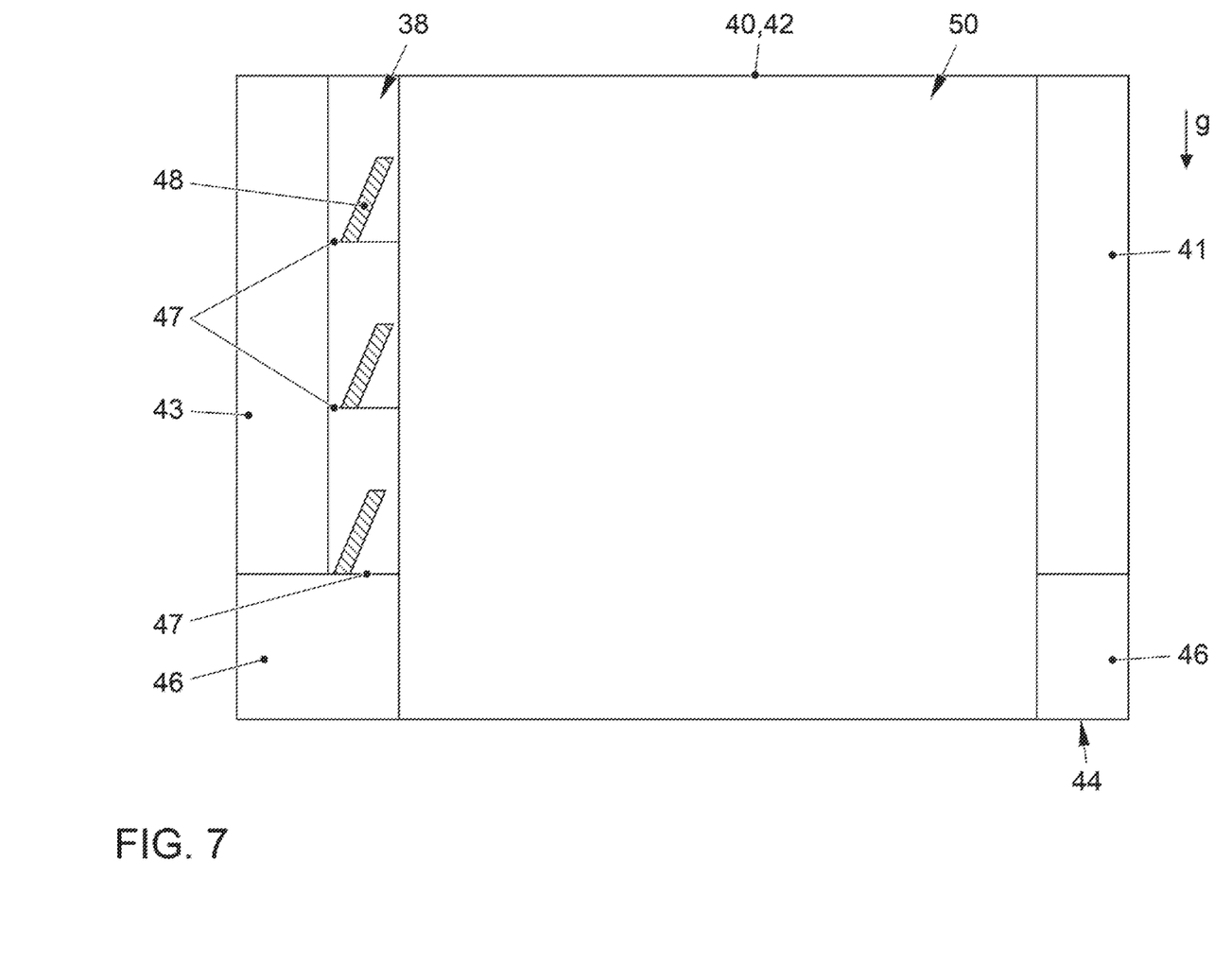

On the first side 40 of the membrane 38 along which the humid gas stream is guided, linear flow webs 47 are arranged parallel to each other which guide the gas stream over the entire surface of the membrane 38 and support the membrane 38, as is clear in FIGS. 2 to 5 and 7. The flow webs 47 preferably have a lower height than the first channel 41 with the humid gas stream, so that liquid water can easily reach the collecting container 46. As shown in FIGS. 2, 3, 7, separator elements 48 are arranged at the flow webs 47 at which the water entrained in the humid gas stream is separated and is then discharged via the membrane 38 in the direction of the force of gravity, and said membrane is thereby moistened. As described, a separation of liquid water takes place at the separator elements 38, and at the same time the membrane 30 is also moistened on the surface by the humid gas stream. This applies to all embodiments of the humidifier 37. The separator elements 48 may be arranged one above the other (FIG. 2) or offset relative to one another (FIG. 3) at the flow webs 47. It is also provided that the separator elements may be unevenly distributed across the surface area of the membrane 38 to promote more intensive humidification via separator elements 48, for example of regions of the membrane 38 which are typically dryer than other regions. The height of the separator elements 48 preferably corresponds to the height of the first channel in order to achieve the highest possible efficiency and to support the membrane 38. However, the separator elements 48 may also have different heights so that, across the surface area of the membrane 38, specifically targeted regions can be moistened more extensively.

Separator elements 48 are likewise provided in the region of the collecting container 46, but preferably no flow webs 47 are necessary here, so that the separator elements 48 are arranged adjacent to the membrane 38 without the use of flow webs 47. This applies to all embodiments according to FIGS. 2 to 7.

Figure 4:
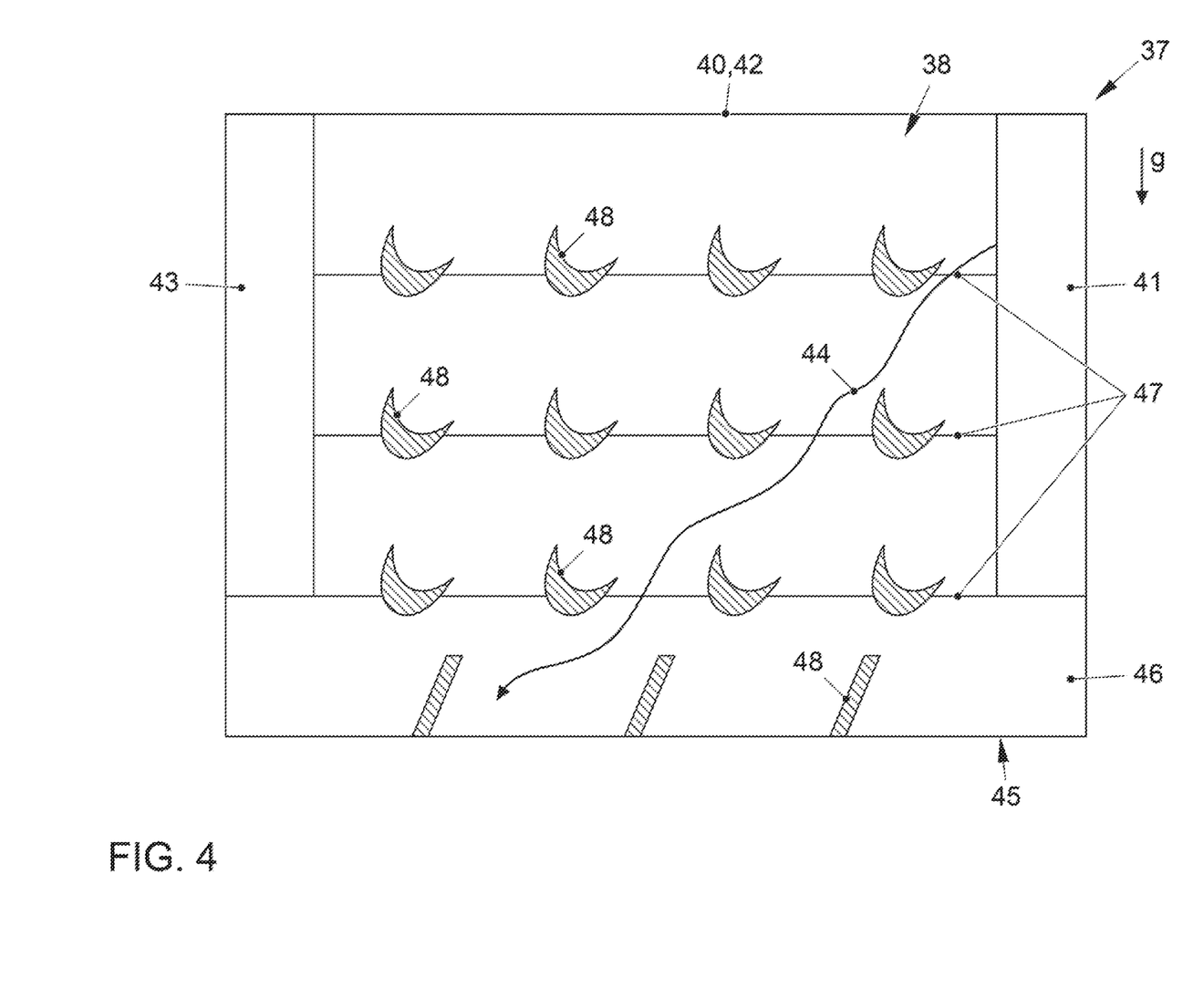

A particularly preferred embodiment of the separator elements 48 of the humidifier 37 is shown in FIG. 4, in which the separator elements 48 are designed such that they receive a certain volume of liquid water (liquid volume) adjacent to membrane 38. This is achieved in that a recess is formed in the separator elements 48 in relation to the force of gravity g, which recess can receive separated water. The separator elements 48 or their recesses are open toward the membrane 38 so that the water in the recesses of the separator elements 48 are [sic] in direct contact with the membrane 38. Preferably, the height of the separator elements 48 with recess corresponds to the height of the first channel 41, so that the recesses on the other side are preferably delimited by a wall of the first channel 41. On this side, the recesses can be formed in a closed manner, but this represents an increased manufacturing cost, such that an open design is preferred. The separator elements 48 in the region of the collecting container 46 may be formed without a recess, since here the water in the collecting container 46 is available for humidifying the membrane 38.

Figure 5:
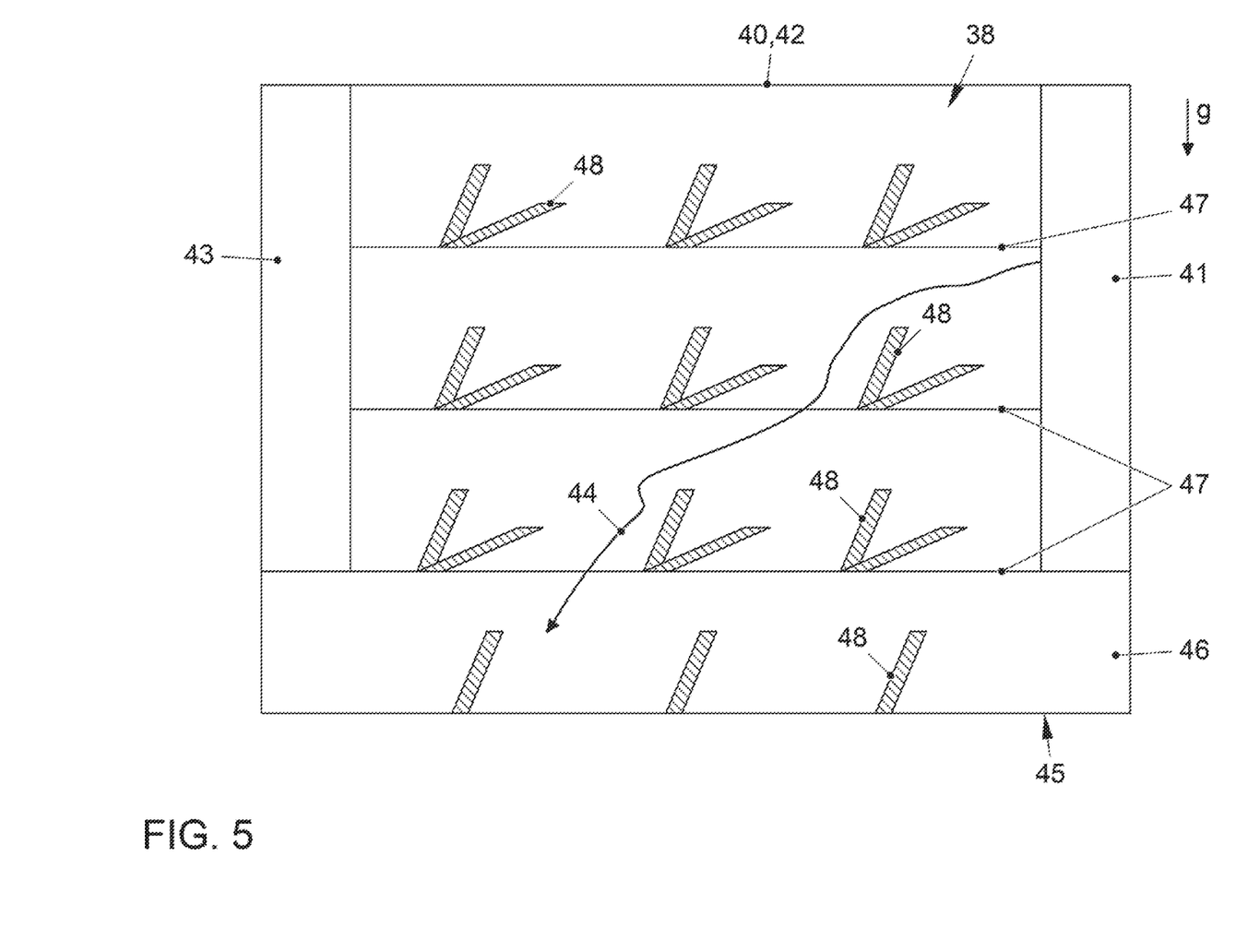

FIG. 5 shows an embodiment of the separator elements 48 that is alternative to FIG. 4 and that is configured such that it can receive a certain volume of liquid water (liquid volume) adjacent to the membrane 38. Here, these separator elements 48 are formed by a bent strip of material whose bend forms the recess for receiving the liquid water. As in the previous embodiment, the water is then in direct contact with membrane 38 and a wall of the first channel 41. The separator elements 48 in the region of the collecting container 46 are formed without a recess, as described in FIG. 4.

Figure 6:
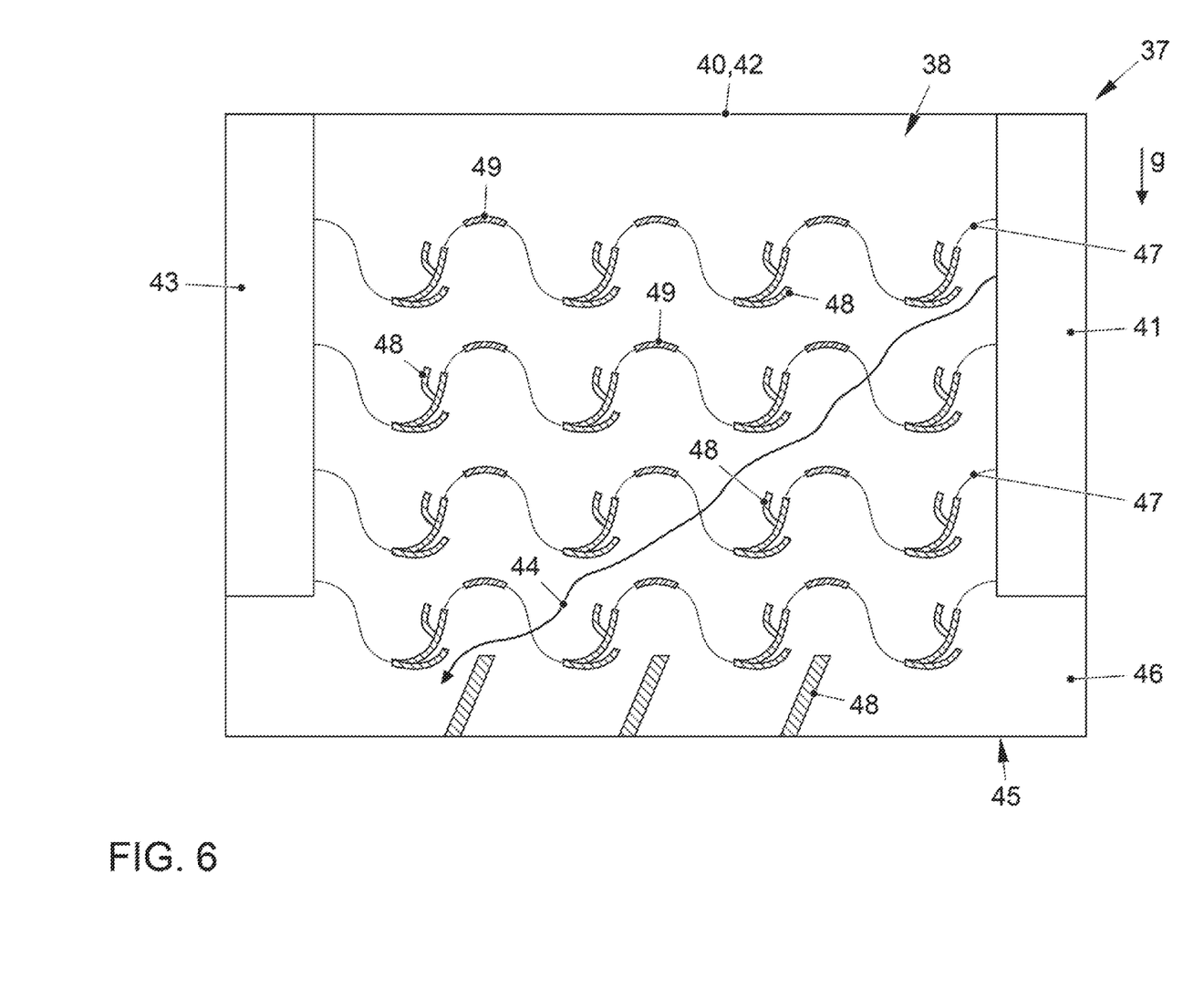

FIG. 6 shows an embodiment of the humidifier 37, in which the flow webs 47 are configured wave-shaped, so that advantageously the moist gas is guided over a larger area of the membrane and even more uniform humidification can be achieved. Adapted to the wave-shaped configuration of the flow webs 47, separator elements 48 are provided on these that also have recesses to receive water. The lateral boundaries of the recesses are designed analogous to the embodiments of FIGS. 4 and 5. Arranged at the highest point of the wave-shaped flow webs 47 are additional separator elements 49 which only separate the water, but do not keep said water in contact with membrane 38. The separator elements 48 in the region of the collecting container 46 are formed without a recess, as described in FIG. 4.

In the embodiment of the humidifier 37 of FIG. 7, a portion of membrane 38 is covered by a porous layer 50 from which most of the moisture of the gas stream is taken up and delivered uniformly to the membrane 38 for humidification. In turn, part of the membrane 38 which is only overflowed by the gas stream when the porous coating 50 has been passed is provided with separator elements 48 disposed on flow webs 37, so that the portion of the water not separated by contact with the porous coating 50 can be removed from the gas stream. The water separated at the separator elements 48 reaches the collecting container 48, into which the membrane 38 provided with the porous coating 50 protrudes and draws said water again so that this water can also be distributed across the membrane 38. In the region of the collecting container 46, no separator elements 48 are formed without a recess, as described in FIG. 4.

LIST OF REFERENCE SYMBOLS

100 Fuel cell system
10 Fuel cell stack
11 Individual cell
12 Anode chamber
13 Cathode chamber
14 Polymer electrolyte membrane
15 Bipolar plate
20 Anode supply
21 Anode supply path
22 Anode exhaust path
23 Fuel tank
24 Actuating means
25 Fuel recirculation line
26 Compressor
30 Cathode supply
31 Cathode supply path
32 Cathode exhaust path
33 Compressor
34 Electric motor
35 Power electronics
36 Turbine
37 Humidifier
38 Membrane
39 Separator
40 Second side
41 First channel
42 Second side
43 Second channel
44 Arrow
45 Frame
46 Collecting container 47 Flow web
48 Separator element
49 Additional separator element
50 Porous coating
g Force of gravity

The invention claimed is:

1. A humidifier for humidifying process gases of fuel cells, the humidifier comprising:
a water vapor-permeable membrane; and
separator elements for separating water, wherein:
the water vapor-permeable membrane on a first side is in contact with a first channel for a first humid gas stream, and on a second side is in contact with a second channel for a second, dry gas stream to be humidified; and
a plurality of separate separator elements are arranged on the first side of the water vapor-permeable membrane.

2. The humidifier according to claim 1, wherein at least a part of the separator elements is formed to receive a volume of liquid in contact with the water vapor-permeable membrane.

3. The humidifier according to claim 1, wherein, from the first side of the water vapor-permeable membrane, a first plurality of flow webs are arranged which carry at least one or more of the separator elements, and wherein a second plurality of flow webs are arranged on the water vapor-permeable membrane on the second side, which flow webs on the second side are arranged to correspond to the flow webs on the first side.

4. The humidifier according to claim 1, wherein at least a part of the flow webs is formed as separator elements.

5. The humidifier according to claim 1, wherein the humidifier is a plate humidifier and the separator elements are formed to support the water vapor-permeable membrane.

6. The humidifier according to claim 1, wherein the humidifier has a plurality of layers comprising the first channel, the second channel, and the water vapor-permeable membrane.

7. The humidifier according to claim 1, wherein the humidifier includes a collecting container for collecting separated water, which is connected to the first channel having a discharge opening for separated liquid water, the collecting container comprising at least one of an overflow valve and a controllable drain valve.

8. The humidifier according to claim 1, wherein the water vapor-permeable membrane is partially provided with a porous coating on the first side.

9. The humidifier according to claim 1 wherein a height of the separator elements with respect to the water vapor-permeable membrane corresponds to a height of the first channel with respect to the water vapor-permeable membrane.

10. The humidifier according to claim 1 wherein each of the separator elements includes a recess configured to receive separated liquid water.

11. The humidifier according to claim 1 wherein the humidifier is external to the fuel cells, the first humid gas stream is an effluent from the fuel cells, and the second dry gas stream is an influent to the fuel cells.

12. A fuel cell system comprising:
a fuel cell stack;
an anode supply having an anode supply path for supplying an anode operating medium to the fuel cell stack, and an anode exhaust path for discharging an anode exhaust gas from the fuel cell stack;
a cathode supply having a cathode supply path for supplying a cathode operating medium to the fuel cell stack, and a cathode exhaust path for discharging a cathode exhaust gas from the fuel cell stack; and
a humidifier arranged in either the anode supply or in the cathode supply, the humidifier comprising:
a water vapor-permeable membrane;
separator elements for separating water, wherein:
the water vapor-permeable membrane on a first side is in contact with a first channel for a first humid gas stream, and on a second side is in contact with a second channel for a second, dry gas stream to be humidified, and
a plurality of separate separator elements are arranged on the first side of the water vapor-permeable membrane; and
optionally a turbine arranged after the humidifier in a flow direction of humid exhaust air from the fuel cell stack.

13. The fuel cell system of claim 12, wherein in the humidifier, from the first side of the water vapor-permeable membrane, a first plurality of flow webs are arranged which carry at least one or more of the separator elements, and wherein a second plurality of flow webs are arranged on the water vapor-permeable membrane on the second side, which flow webs on the second side are arranged to correspond to flow webs on the first side.

14. A vehicle comprising:
a fuel cell stack;
a humidifier for humidifying process gases of fuel cells, the humidifier comprising:
a water vapor-permeable membrane; and
separator elements for separating water, wherein:
the water vapor-permeable membrane on a first side is in contact with a first channel for a first humid gas stream, and on a second side is in contact with a second channel for a second, dry gas stream to be humidified, and
a plurality of separate separator elements are arranged on the first side of the water vapor-permeable membrane.

15. The vehicle of claim 14, wherein the humidifier includes a collecting container for collecting separated water, which is connected to the first channel having a discharge opening for separated liquid water.

16. A vehicle comprising:
a fuel cell stack;
an anode supply having an anode supply path for supplying an anode operating medium to the fuel cell stack, and an anode exhaust path for discharging an anode exhaust gas from the fuel cell stack;
a cathode supply having a cathode supply path for supplying a cathode operating medium to the fuel cell stack, and a cathode exhaust path for discharging a cathode exhaust gas from the fuel cell stack; and
a humidifier arranged either in the anode supply or in the cathode supply, the humidifier comprising:
a water vapor-permeable membrane;
separator elements for separating water;
the water vapor-permeable membrane on a first side is in contact with a first channel for a first humid gas stream, and on a second side is in contact with a second channel for a second, dry gas stream to be humidified; and
a plurality of separate separator elements are arranged on the first side of the water vapor-permeable membrane.

17. The vehicle of claim 16, wherein the humidifier includes a collecting container for collecting separated water, which is connected to the first channel having a discharge opening for separated liquid water.

18. The vehicle of claim 16 wherein in the humidifier, from the first side of the water vapor-permeable membrane, a first plurality of flow webs are arranged which carry at least one or more of the separator elements, and wherein a second plurality of flow webs are arranged on the water vapor-permeable membrane on the second side, which flow webs on the second side are arranged to correspond to flow webs on the first side.

\* \* \* \* \*